United States Patent [19]

Scallan

[11] Patent Number: 4,585,514

[45] Date of Patent: Apr. 29, 1986

[54] METHOD OF APPLYING THEFT-DETERRENT INDICIA

[75] Inventor: L. Joe Scallan, Cincinnati, Ohio

[73] Assignee: Pro-Guard, Inc., Covington, Ky.

[21] Appl. No.: 664,426

[22] Filed: Oct. 24, 1984

[51] Int. Cl.⁴ .................. B44C 1/22; C03C 15/00; C03C 25/06

[52] U.S. Cl. .................. 156/631; 156/635; 156/659.1; 156/663; 252/79.3

[58] Field of Search .......... 156/635, 657, 645, 659.1, 156/663, 631; 252/79.3; 65/31

[56] References Cited

U.S. PATENT DOCUMENTS 2,067,925  1/1937  Clayton-Kennedy ............ 252/79.3
4,316,766  2/1982  Levin et al. .................... 156/631

Primary Examiner—William A. Powell
Attorney, Agent, or Firm—Wood, Herron & Evans

[57] ABSTRACT

A method is disclosed for etching identifying indicia, such as a vehicle identification number, onto an automobile window, including the steps of cutting a template from stencil paper using an electric typewriter, wetting the template, cleaning and moistening the window, applying the template to the window, coating the template with a thin coating of an etching compound, allowing the compound to remain in place for approximately three minutes, and thereafter removing the template and washing and drying the etched area of the window.

6 Claims, 3 Drawing Figures

METHOD OF APPLYING THEFT-DETERRENT INDICIA

BACKGROUND OF THE INVENTION

This invention is directed to methods of etching indicia on glass surfaces and is particularly directed to a method of applying vehicle identification indicia to the windows of automobiles as a deterrent to vehicle theft.

In the past, many different approaches have been taken to deter the theft of automobiles. Such approaches include the provision of vehicle alarm systems, steering wheel locks and other enhanced locking arrangements and the like. Each of these theft-deterrent approaches has one or more inherent disadvantages. Thus, for example, even sophisticated alarm and locking systems can readily be defeated by experienced car thieves.

SUMMARY OF THE INVENTION

It is a principal object of the present invention to provide an improved theft-deterrent system which involves the permanent application of identification numbers to the windows of an automobile. The numbers applied are preferably the vehicle identification number assigned by the automobile manufacturer. These numbers are readily visible and cannot be altered. If an attempt is made to obliterate the numbers in some manner, this obliteration is readily apparent and is an obvious warning to a prospective customer that the vehicle has likely been stolen.

Indeed, the only way of completely removing the identification numbers is to remove and replace all of the windows of the vehicle. This is a time-consuming and expensive procedure which might cost, for example, of the order of Two Thousand Dollars. Of course, it the thief leaves the identification numbers intact, the stolen vehicle can be identified. Since vehicle identification numbers are stored in several computer systems, the likelihood of recovering the vehicle is greatly enhanced. Experience has shown that car thieves aware of the problems presented by identification numbers permanently applied to car windows tend not to steal such vehicles, but rather to pass them by in favor of vehicles which are not so protected.

More particularly, it is an object of the present invention to provide a method for etching vehicle identification numbers on the windows of vehicles in such a manner that the numbers are clear and sharp and are free from any objectionable marring of the adjacent window surface.

It is a still further object of the present invention to provide a novel method of etching identification numbers on the windows of vehicles, which method is relatively inexpensive and requires a minimum amount of time and equipment.

It is another object of the present invention to provide a method of applying identification numbers to vehicles which is relatively simple so that it can be effectively practiced by personnel with minimum training or even by vehicle owners following adequate instructions.

More particularly, in accordance with the present invention, each of the windows of a vehicle has an identification number etched in a corner or other visible portion of the window which is out of the driver's or passengers' normal line of sight. The number used is preferably the vehicle identification number assigned by the manufacturer. Conventionally, this number consists of seventeen alpha numeric characters.

Utilizing the present method, the number is applied by first preparing a template on a sheet of suitable stencil paper having a composition such that sharp images may be formed therein and the bleeding of an etching composition through the stencil is prevented. Openings corresponding to the characters of the identification number are cut in the template utilizing an electric typewriter. It has been empirically determined that an IBM Model 60, IBM Model 65, IBM Model 80, or IBM Model 85 Memory Typewriter fitted with a Dual Gothic Type Ball provides extremely sharp cut characters in the stencil paper. After the stencil has been prepared, it is dipped in water, or under low temperature conditions in a mineral spirit solvent.

In the next step of the process, the window is cleaned and moistened and the small template is pressed into position. The wet template is held in place by capillary action. Thereafter, a thin coating of an etching compound, for example, a compound of cream-like consistency consisting of fluoride salts, inert solids and water, is applied to the rear surface of the template and is allowed to remain in place for a predetermined time, three minutes in a preferred embodiment. At the end of this time, the template is removed and the etched area of the window is wiped with a moistened tissue, rinsed and dried.

One advantage of the present method is that it does not materially detract from the appearance of the vehicle. The number applied is sharp and no unsightly blemished areas are formed.

Another advantage of the present invention is that the equipment and supplies utilized can be transported and the templates prepared for use in a small van which can be driven to an auto dealership. All of the vehicles at the dealership requiring identification can be marked in a relatively short time and the van can be moved to another dealership.

A still further advantage of the present method is that it is relatively simple and can be effectively practiced by relatively unskilled personnel with a minimum of training or even by individual automobile users provided with a kit containing precut templates bearing their identification number and a quantity of etching compound.

BRIEF DESCRIPTION OF THE DRAWINGS

These and other objects and advantages of the present invention will be more readily apparent from the following detailed description of the drawings illustrating a preferred embodiment of the invention. In the drawings.

DESCRIPTION OF A PREFERRED EMBODIMENT

Figure 1:
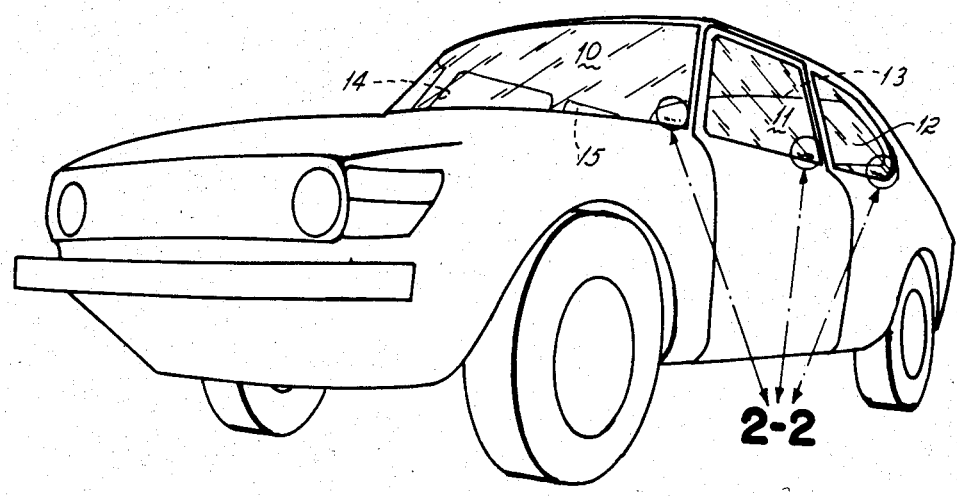
FIG. 1 is a perspective view of a vehicle showing a typical application of vehicle identification numbers to the windshield, side and rear windows of an automobile.

FIG. 1 illustrates a vehicle having its windows marked with vehicle identification numbers in accordance with the present method. As shown in FIG. 1, the numbers are applied to the lower corner of the front windshield 10 and to side windows 11 and 12 in the lower corners as indicated by the circles marked 2. It is to be understood that the same indicia is applied to the rear window 13 and side windows 14 and 15. It is also to be understood that the indicia may be placed at some other location on the windows other than the lower corners if desired.

Figure 2:
FIG. 2 is an enlarged view of the etched vehicle identification number enclosed within the circles 2—2 of FIG. 1, the vehicle identification number in FIG. 2 being shown full size.

FIG. 2 illustrates one typical form of identification in full size. As there shown, the indicia includes the letters "VIN", standing for "vehicle idetification number" and a line of alpha numeric characters, i.e., 1G3AR4-7A6BMS19761, corresponding to the vehicle identification number assigned to that particular vehicle by the manufacturer. As shown in FIG. 2, the vehicle identification number consists of a combination of 17 letters and numerals which, in the aggregate, are approximately 1⅜" long with the individual characters being approximately 3/32" in height. The characters of the identification number are sharp and clear and the adjacent area of the window does not have any unsightly marred areas.

Figure 3:
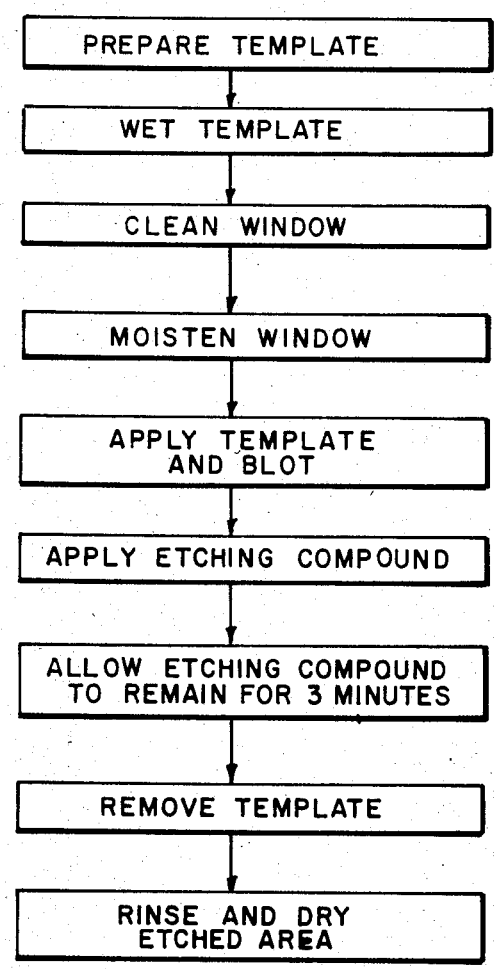
FIG. 3 is a diagram showing the steps involved in a preferred form of the present method.

The steps of a preferred form of the present method of applying the indicia illustrated in FIGS. 1 and 2 are diagrammatically shown in chart form in FIG. 3. More particularly, the first step involves the preparation of a template. A preferred form of template is a sheet of stencil material manufactured by Frismar, Inc. and sold under the trademark "Pro-Guard T.D.S. 313". This stencil material is a coated paper having the following specifications:

6½ lb. calendared paper
Weight (uncoated)=1.1 gm/160 sq. in.
Total Weight (coated paper)=5-5.2 gm/160 sq. in.
Paper=non-woven nitrocellulose calendared web formed from 100% manila hemph The coating is a plasticizer system formed with oleil alcohol, castor oil, primary alcohols, mineral oil, surfactants (non-ionic), tergitol and oleic acid. The primary ingredients are castor oil, oleil alcohol and oleic acid. The plasticizer system also includes a pthalo-red pigment. It is believed significant that this paper does not include substantial amounts of titanium oxide or clay which might permit the etching composition used in the process to bleed through the stencil.

The stencil is cut using an electric typewriter operation in the stencil mode. It has been empirically determined that an IBM Model 60 Memory Typewriter fitted with an IBM Dual Gothic Ball produces extremely sharp images when used in conjunction with Pro-Guard T.D.S. 313 stencil material. The width of the type at the typing surface of an IBM Dual Gothic Ball is approximately 0.003" with the transverse walls of the type face extending at an angle of 50° to the transverse type surface.

In a prefered form of the present method, several identification numbers are typed onto a single 6"×6½" sheet of stencil material. After these numbers are typed, the stencil material is preferably cut into sections approximately 1⅜"×3". The resulting template is dipped into water or, if the ambient air temperature is 40° or less, in a mineral spirit solvent.

In the next step, the area of the car window to be etched is cleaned and is then moistened with water. The wet template is pressed against the window. It remains in place as a result of the capillary action of the moistened stencil which provides the necessary adhesion.

In the next step, any excess moisture is removed from the stencil by blotting it with a high absorbancy tissue. Thereafter, an etching compound is brushed over the stencil, leaving a thin coating on the exposed portions of the window pane. Preferably, this coating is approximately one to three angstroms in thickness. A preferred form of etching compound has the following composition:

Fluorides
  Ammonium Bifluoride 6%
  Sodium Bifluoride 28%
Inert Solids 22%
Water 41%
Other Inert Ingredients 3%

One suitable form of etching compound is produced by McKay Chemical Company, Inc. and is sold under the trademark "Velvet Etch Corrosive Liquid Un No. 1760". This etching composition is heated if necessary to a temperature above 45° F.

After the etching compound has been applied, it is allowed to remain for three minutes. At the end of that time, the template is removed by peeling it from the window. The etched area of the window is thoroughly rinsed and dried with a clean rag.

After a template has been used it is discarded. The process is then repeated with a new template for each window of the vehicle.

From the above disclosure of the general principles of the present invention and the preceding detailed description of a preferred embodiment, those skilled in the art will readily comprehend the various modifications to which the present invention is susceptible. Therefore, I desire to be limited only by the scope of the following claims.

Having described my invention, I claim:

1. A method of applying identifying indicia to an automobile window comprising the steps of:
    (a) preparing a template with the desired idetification indicia by cutting a sheet of a coated non-woven nitrocellulose stencil paper resistant to seepage of acid therethrough with the said indicia utilizing an electric typewriter having type with side walls that slope relative to the typing surface, the electric typewriter forming openings in said stencil sheet corresponding to said indicia;
    (b) wetting said template;
    (c) cleaning the window area to be etched;
    (d) moistening said window area;
    (e) pressing the template against said window area and removing excess moisture from the template;
    (f) brushing a thin layer of an etching compound containing sodium bifluoride and ammonium bifuloride over said template;
    (g) allowing the etching compound to remain for a predetermined time;
    (h) thereafter removing said template from the window; and
    (i) rinsing and drying said etched window area.

2. The method of claim 1 in which said template comprises a stencil material consisting of 6½ pound calendared nonwoven nitrocellulose paper formed from 100% manila hemph weighing approximately 1.1 gram/160 square inches, with the total weight of the coated paper being approximately 5-5.2 grams/160 square inches, said paper being coated with a plasticizer system formed primarily with oleil alcohol, castor oil and oleic acid.

3. The method of claim 2 in which the electric typewriter used to cut said stencil paper employs a typewriting ball having a type width of 0.003 inches and having transverse walls extending at an angle of 50° to the typewriting surface.

4. The method of claim 1 in which the etching compound has a composition comprising ammonium bifluoride 6%, sodium bifluoride 28%, inert binder 22%, water 41% and other inert ingredients 3%.

5. The method of claim 4 in which the etching compound is applied in a thin coating of from one to three angstroms and is allowed to remain in contact with the window for approximately three minutes.

6. The method of claim 3 in which the etching compound has a composition comprising ammonium bifluoride 6%, sodium bifluoride 28%, inert binder 22%, water 41% and other inert ingredients 3% and in which the etching compound is applied in a thin coating of from one to three angstroms and is allowed to remain in contact with the window for approximately three minutes.

* * * * *